Figure 1:
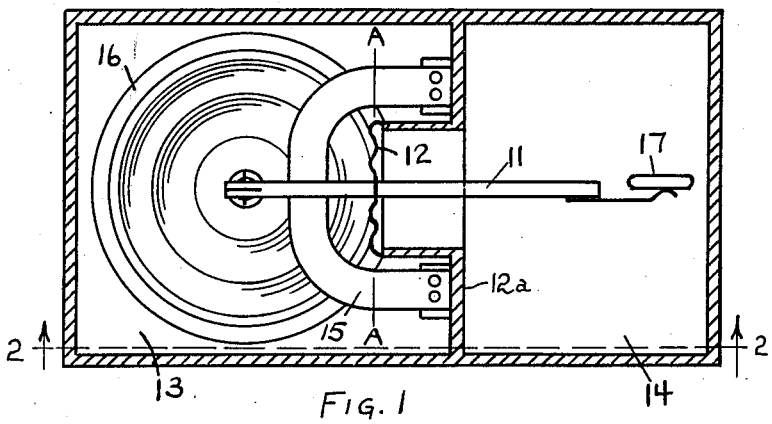

March 20, 1951     J. B. PETERSON     2,545,530

DIAPHRAGM SEAL

Filed May 14, 1946

Inventor

JOHN B. PETERSON

By Strauch & Hoffman

Attorneys

Patented Mar. 20, 1951

2,545,530

UNITED STATES PATENT OFFICE 2,545,530

DIAPHRAGM SEAL

John B. Peterson, Bethesda, Md.; Ruth L. Peterson administratrix of said John B. Peterson, deceased Application May 14, 1946, Serial No. 669,543

2 Claims. (Cl. 286—29)

This invention relates to mechanism for transmitting motion through the wall of a hermetically sealed compartment. A usual method of doing this is to mount a lever perpendicular to, and through the center of a flexible diaphragm in the wall of the compartment. The motion of a lever mounted on pivots and bearings is limited to rotation about a fixed axis. This is not true of a lever mounted in the usual manner through a diaphragm seal, especially if the differential pressure across the diaphragm varies. For some applications this failure to hold a fixed axis of rotation is a disadvantage.

It is an object of this invention to provide a novel means for pivoting a lever at the wall of a hermetically sealed compartment which will restrict the movement of the lever to rotation around a fixed axis. It is a further object to provide such a mounting which will be free of certain faults which may be present in pivots and bearings, such as friction and shake. It is a still further object to provide a mounting which will be more durable and shock resisting than pivots and bearings.

Figure 2:
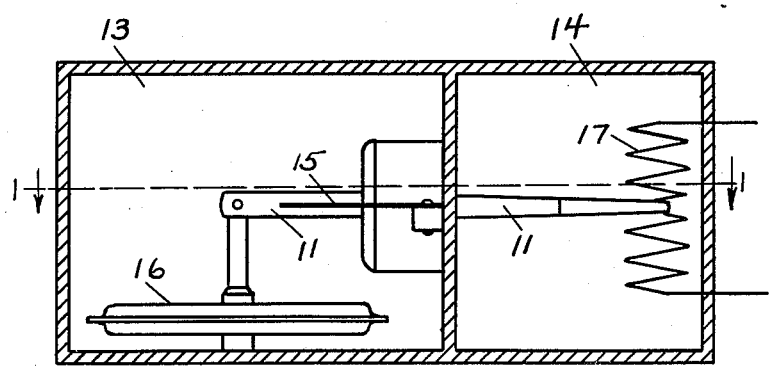

With the foregoing and other objects in view, the invention consists in the construction, combination and arrangement of parts hereinafter described and illustrated in the drawings, in which:

Figure 1 shows a section through a typical diaphragm seal, and Figure 2 shows another section through the same diaphragm seal, the section of Figure 2 being at a right angle to the section of Figure 1.

Referring to the drawings, lever 11 is fixed to flexible diaphragm 12 at the center thereof, so as to transmit motion through the hermetically sealed wall 12a between compartments 13 and 14. A U-shaped flexure member 15, is fastened at its center to the lever and each end is fastended to the compartment wall 12a. This flexure member prevents longitudinal motion of the lever and limits the motion of the lever to a plane perpendicular to axis A—A. Axis A—A passes through the U-shaped flexure member when this flexure member is in its neutral position. The motion of the lever is then limited just as it would be if pivoted on axis A—A. However, the flexure device, in addition to sealing at the chamber wall has the advantage of being more rugged and shock resisting than pivots and bearings.

Figures 1 and 2 show pressure bellows 16 on one end of the lever arm and a potentiometer 17 on the other end. These terminal mechanisms are only illustrative of possible applications and it is not intended that the application of the invention be so restricted.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a motion transmitting system; a fluid tight wall having an opening therethrough; a flexible diaphragm mounted in said opening to seal it; a lever passing substantially perpendicularly through and rigidly secured to said diaphragm substantially at its center; and means preventing longitudinal movement of said lever and rotation thereof except in one plane, comprising a planar member flexible only in a direction perpendicular to its plane and mounted substantially perpendicular to the plane of said diaphragm, said resilient planar member being rigidly secured at its midpoint to said lever on one side of said diaphragm and at its ends to said wall on the other side of said diaphragm.

2. In a motion transmitting system; a fluid tight wall having an opening therethrough; a flexible diaphragm mounted in said opening to seal it; a lever passing substantially perpendicularly through and rigidly secured to said diaphragm substantially at its center; and a substantially planar U-shaped flexure member rigidly secured at its midpoint to said lever on one side of said diaphragm and at its end portions to said wall on the other side of said diaphragm; said diaphragm being substantially perpendicular to the plane of said flexure member and lying substantially midpoint of the points where said member is secured to said wall and said lever.

JOHN B. PETERSON.

REFERENCES CITED

The following references are of record in the file of this patent:

UNITED STATES PATENTS

| Number | Name | Date |
|---|---|---|
| 392,617 | Lieb et al. | Nov. 13, 1888 |
| 1,117,892 | Norris | Nov. 17, 1914 |
| 1,291,869 | Heeley | Jan. 21, 1919 |
| 1,716,377 | Grant | June 11, 1929 |

FOREIGN PATENTS

| Number | Country | Date |
|---|---|---|
| 11,724 | Great Britain | of 1915 |